No. 703,464. Patented July 1, 1902.
R. PORTER.
BUCKLE.
(Application filed Dec. 27, 1897.)
(No Model.)
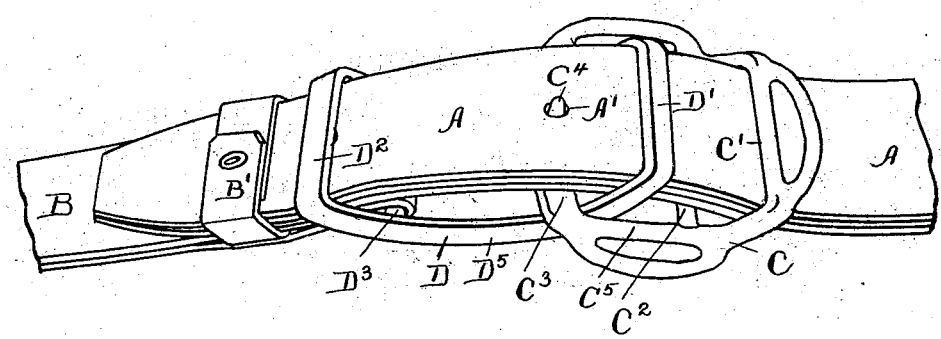
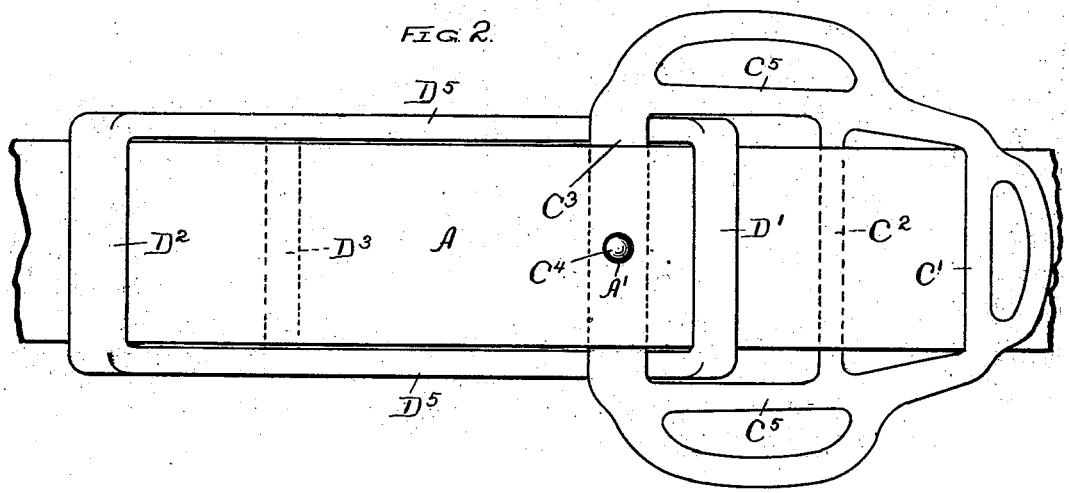
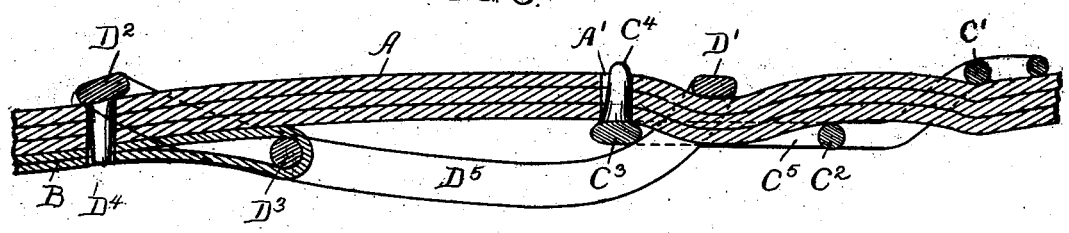
WITNESSES:
INVENTOR:
ROBERT PORTER
BY Munday, Evarts & Adcock
HIS ATTORNEYS.
THE NORRIS PETERS CO., PHOTO-LITHO., WASHINGTON, D. C.

UNITED STATES PATENT OFFICE.

ROBERT PORTER, OF OTTUMWA, IOWA.

BUCKLE.

SPECIFICATION forming part of Letters Patent No. 703,464, dated July 1, 1902.

Application filed December 27, 1897. Serial No. 663,458. (No model.)

*To all whom it may concern:*

Be it known that I, ROBERT PORTER, a citizen of the United States, residing in Ottumwa, in the county of Wapello and State of Iowa, have invented a new and useful Improvement in Buckles, of which the following is a specification.

This invention relates to the construction of buckling devices for attaching the traces to the hame-tugs of harness. It is designed to increase the security of the attachment and otherwise improve the construction.

The nature of the invention will be fully understood from the description which I give below, when considered in connection with the accompanying drawings, in which—

Figure 1 is a perspective of the invention. Fig. 2 is an outside elevation, and Fig. 3 is a longitudinal section.

In said drawings, A represents the trace, and B the hame-tug, united by my invention.

C is a buckle-frame having its rear bar C' located outside the trace and its center bar $C^2$ and front bar $C^3$ located behind the trace. $C^4$ is a tongue upon the front bar $C^3$, passing through the perforation A' in the trace.

In connection with the buckle-frame I employ the bail D, which is provided at its ends with cross-bars D' and $D^2$, which pass over the outer side of the trace, and a third cross-bar $D^3$, located behind the trace and serving as a means for the attachment of the hame-tug, it being passed through the loop of the tug, as plainly seen at Fig. 3. The side bars $D^5$ of this bail are bent, as shown more particularly at Figs. 1 and 3, so as to carry the end bars outside of the trace, and the bail is sufficiently narrower than the buckle-frame to allow the rear end of it to be passed between the side bars $C^5$ of the buckle and bear against the cross-bar $C^3$ of the latter, the trace, which is passed under the rear bar D', coacting with said bars of the bail in locking the bail to the buckle-frame. The bail is provided with a tongue $D^4$, projecting inwardly from its forward cross-bar $D^2$ and passing through the trace and into the hame-tug. (See Fig. 3.)

It will be noticed that my invention contains several valuable features. First, the trace is held down upon the buckle-tongue $C^4$ by the rear and front cross-bars of the bail, so that it is prevented from slipping off said tongue when the horse is backing or holding back, as in going downhill; second, the tongue upon the bail greatly increases the security of the attachment of the trace, because even if the trace should slip off of tongue $C^4$ the tongue D will still be in engagement and will hold it securely; third, the cross-bar $D^3$ and the cross-bar $D^2$ operate together to keep the trace and tug in their proper close proximity and form a loop through which the trace may be passed between the buckle-tongue and the loop B', carried by the hame-tug.

The tongue $D^4$ may or may not be used, as desired. I prefer to use it, however, because, as already stated, it increases the security of the attachment, and when there are tongues both on the buckle-frame and on the bail the strain of the trace-holes when the draft is on will not be so great as it would be in case only one tongue were used. The tongue may be applied to the cross-bar $D^3$ of the bail, if preferred.

It will be further noticed that the outer cross-bar D' of the bail and the inner cross-bars $C^2$ and $C^3$ of the buckle-frame are arranged relatively at the points of a triangle, the bar D' being outside and the others inside the brace and the bar D' being intermediate the planes of the other two. By reason of this the pull or strain of the bar D' upon the trace is opposed by the bars $C^2$ and $C^3$, but in such manner as to enable the bar D' to depress the trace between $C^2$ and $C^3$, and thus give it a very strong hold or purchase upon the trace. In this action the bail has a strong leverage upon the trace, with the bar $C^3$ as its fulcrum.

I claim—

The buckle consisting of a frame C having outer cross-bar C', and inner cross-bars $C^2$ and $C^3$, the latter carrying a tongue, and a bail adapted to be entered between said cross-bars $C^2$ and $C^3$ and having outer cross-bars D' and $D^2$ at its ends, both adapted to bear on the outside of the trace, and the bar D' being located between the planes of cross-bars $C^2$ and $C^3$, said bail also having an inside cross-bar $D^3$ for the attachment of the hame-tug, substantially as specified.

ROBERT PORTER.

Witnesses:
CHAS. HALL,
W. W. CHRISTIE.